United States Patent
Kowalevicz

(10) Patent No.: US 12,271,069 B2
(45) Date of Patent: Apr. 8, 2025

(54) DUAL-POLARIZATION ROTATIONALLY-INSENSITIVE MONOSTATIC TRANSCEIVER WITH DUAL CLADDING FIBER

(71) Applicant: Raytheon Company, Waltham, MA (US)

(72) Inventor: Andrew M. Kowalevicz, Arlington, VA (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 17/933,779

(22) Filed: Sep. 20, 2022

(65) Prior Publication Data

US 2023/0085835 A1   Mar. 23, 2023

Related U.S. Application Data

(60) Provisional application No. 63/246,676, filed on Sep. 21, 2021, provisional application No. 63/246,648, (Continued)

(51) Int. Cl.
*G02F 1/09* (2006.01)
*G02B 6/036* (2006.01)
(Continued)

(52) U.S. Cl.
CPC ......... *G02F 1/093* (2013.01); *G02B 6/03622* (2013.01); *G02B 6/2746* (2013.01);
(Continued)

(58) Field of Classification Search
CPC ....... G02F 1/093; G02F 1/09; G02B 6/03622; G02B 6/2746; G02B 6/2766; G02B 27/283; H04B 10/1225; H04B 10/614
See application file for complete search history.

(56) References Cited

U.S. PATENT DOCUMENTS 5,052,786 A * 10/1991 Schulz ............... G02F 1/093
                                                    359/489.03
5,729,380 A *  3/1998 Betin ................. G02F 1/3538
                                                    359/302
(Continued)

FOREIGN PATENT DOCUMENTS

CN     101089667 A  * 12/2007  ............. G02F 1/093
CN     101089667 B  *  5/2013  ............. G02F 1/093
(Continued)

OTHER PUBLICATIONS

Elmansouri et al., Compact Wideband Dual-Polarized In-Band Full-Duplex Antenna Subsystem, in IEEE Transactions on Antennas and Propagation, vol. 69, No. 11, pp. 7166-7172, Nov. 2021, doi: 10.1109/TAP.2021.3050570 (Year: 2021).*

(Continued)

*Primary Examiner* — Peter Radkowski

(57) ABSTRACT

An apparatus includes multiple dual cladding waveguides each having a single-mode interior section that transports one of multiple outgoing optical signals and a multimode section at least partially surrounding the interior section that transports one of multiple incoming optical signals. Different outgoing signals have different polarizations, and different incoming signals have different polarizations. The apparatus also includes a polarization beamsplitter that combines the multiple outgoing signals to produce transmit optical signals and separates receive optical signals to produce the multiple incoming signals.

20 Claims, 4 Drawing Sheets

Related U.S. Application Data filed on Sep. 21, 2021, provisional application No. 63/246,693, filed on Sep. 21, 2021.

(51) Int. Cl.

| | |
|---|---|
| *G02B 6/27* | (2006.01) |
| *G02B 27/28* | (2006.01) |
| *H04B 10/112* | (2013.01) |
| *H04B 10/61* | (2013.01) |

(52) U.S. Cl.
CPC ......... *G02B 6/2766* (2013.01); *G02B 27/283* (2013.01); *H04B 10/1125* (2013.01); *H04B 10/614* (2013.01); *G02F 1/09* (2013.01)

(56) References Cited

U.S. PATENT DOCUMENTS

| | | | | |
|---|---|---|---|---|
| 5,793,789 | A * | 8/1998 | Ben-Michael | B82Y 20/00 |
| | | | | 372/45.01 |
| 6,400,990 | B1 * | 6/2002 | Silvian | G08C 17/00 |
| | | | | 607/30 |
| 6,476,959 | B2 * | 11/2002 | Yao | H01S 3/302 |
| | | | | 359/347 |
| 6,545,805 | B2 * | 4/2003 | He | G02B 5/12 |
| | | | | 359/239 |
| 6,563,982 | B1 * | 5/2003 | Xie | G02B 6/2746 |
| | | | | 385/33 |
| 6,577,900 | B1 * | 6/2003 | Silvian | A61N 1/37211 |
| | | | | 607/32 |
| 7,027,198 | B2 * | 4/2006 | Yao | G02B 27/28 |
| | | | | 359/259 |
| 7,067,795 | B1 * | 6/2006 | Yan | G02F 1/0136 |
| | | | | 250/225 |
| 7,218,436 | B2 * | 5/2007 | Yao | G01J 4/00 |
| | | | | 359/259 |
| 7,409,157 | B2 * | 8/2008 | Arahira | G02F 1/3519 |
| | | | | 398/154 |
| 7,436,569 | B2 * | 10/2008 | Yao | H04B 10/2569 |
| | | | | 359/259 |
| 7,440,181 | B2 * | 10/2008 | Starodoumov | H01S 3/06754 |
| | | | | 359/347 |
| 7,466,471 | B2 * | 12/2008 | Yao | H04B 10/2569 |
| | | | | 359/259 |
| 7,508,579 | B2 * | 3/2009 | Starodoumov | H01S 3/06754 |
| | | | | 359/347 |
| 8,571,416 | B2 * | 10/2013 | Grobe | H04B 10/5161 |
| | | | | 398/186 |
| 9,755,739 | B1 | 9/2017 | Wang et al. | |
| 9,778,020 | B2 * | 10/2017 | Tumlinson | G01B 9/02015 |
| 9,989,700 | B1 * | 6/2018 | Ayliffe | G02B 6/4246 |
| 10,069,562 | B2 * | 9/2018 | Wang | H04J 14/0227 |
| 10,168,501 | B2 * | 1/2019 | Ashrafi | G02B 6/262 |
| 10,298,325 | B1 | 5/2019 | Birnbaum et al. | |
| 10,326,526 | B2 * | 6/2019 | Ashrafi | G02B 6/4246 |
| 11,170,318 | B2 * | 11/2021 | Ashrafi | G02F 3/00 |
| 11,233,573 | B2 * | 1/2022 | Sandberg | H04B 10/801 |
| 2001/0024317 | A1 * | 9/2001 | Yao | H01S 3/302 |
| | | | | 359/334 |
| 2002/0018618 | A1 * | 2/2002 | Xie | G02B 6/32 |
| | | | | 385/33 |
| 2002/0076144 | A1 | 6/2002 | Tai et al. | |
| 2002/0090161 | A1 * | 7/2002 | Naganuma | G02B 6/29395 |
| | | | | 385/11 |
| 2002/0171931 | A1 * | 11/2002 | McLeod | G02B 6/272 |
| | | | | 359/489.09 |
| 2002/0171933 | A1 * | 11/2002 | He | G02B 27/28 |
| | | | | 359/489.17 |
| 2003/0004412 | A1 * | 1/2003 | Izatt | G01B 9/02069 |
| | | | | 356/479 |
| 2005/0088661 | A1 * | 4/2005 | Froggatt | G01M 11/331 |
| | | | | 356/479 |
| 2005/0200941 | A1 * | 9/2005 | Yao | G01J 4/00 |
| | | | | 359/301 |
| 2006/0023987 | A1 * | 2/2006 | Yao | G02B 6/2766 |
| | | | | 385/11 |
| 2006/0045536 | A1 * | 3/2006 | Arahira | G02F 1/3519 |
| | | | | 398/152 |
| 2007/0031151 | A1 | 2/2007 | Cunningham et al. | |
| 2007/0223078 | A1 * | 9/2007 | Yao | G02B 27/28 |
| | | | | 359/259 |
| 2007/0291358 | A1 | 12/2007 | Colbourne et al. | |
| 2008/0030839 | A1 * | 2/2008 | Yao | G02F 1/0136 |
| | | | | 359/281 |
| 2008/0030846 | A1 * | 2/2008 | Starodoumov | H01S 3/06754 |
| | | | | 359/341.2 |
| 2008/0042050 | A1 | 2/2008 | Tanaka et al. | |
| 2009/0052016 | A1 * | 2/2009 | Starodoumov | H01S 3/06754 |
| | | | | 359/347 |
| 2011/0277552 | A1 * | 11/2011 | Chen | G01J 4/00 |
| | | | | 356/73.1 |
| 2012/0051756 | A1 * | 3/2012 | Grobe | H04B 10/5161 |
| | | | | 398/184 |
| 2012/0154783 | A1 | 6/2012 | Goldberg et al. | |
| 2015/0295658 | A1 * | 10/2015 | Chen | G02B 6/2746 |
| | | | | 398/43 |
| 2016/0047987 | A1 | 2/2016 | Du et al. | |
| 2016/0112124 | A1 | 4/2016 | Juarez et al. | |
| 2016/0341538 | A1 * | 11/2016 | Tumlinson | G01B 9/02015 |
| 2017/0242100 | A1 | 8/2017 | Hinokuma et al. | |
| 2017/0242206 | A1 * | 8/2017 | Chen | G02B 6/00 |
| 2017/0343750 | A1 * | 11/2017 | Ashrafi | G02B 6/2726 |
| 2018/0069631 | A1 * | 3/2018 | Ashrafi | G02B 6/2726 |
| 2018/0102843 | A1 * | 4/2018 | Wang | H04B 10/2589 |
| 2018/0337722 | A1 * | 11/2018 | Paulsen | H01Q 1/288 |
| 2019/0391406 | A1 | 12/2019 | Chen | |
| 2020/0083659 | A1 * | 3/2020 | Reeves-Hall | H01S 3/06787 |
| 2021/0133614 | A1 * | 5/2021 | Ashrafi | G06N 10/00 |
| 2021/0297160 | A1 * | 9/2021 | Sandberg | H04B 10/801 |

FOREIGN PATENT DOCUMENTS

| | | | | |
|---|---|---|---|---|
| CN | 104950407 | B * | 7/2017 | ........... G02B 6/4204 |
| CN | 107390324 | A | 11/2017 | |
| CN | 109286440 | A | 1/2019 | |
| CN | 209746185 | U | 12/2019 | |
| CN | 111504296 | A | 8/2020 | |
| CN | 111969400 | A * | 11/2020 | ......... H01S 3/06754 |
| EP | 1022590 | A1 * | 7/2000 | ........... G02B 27/283 |
| EP | 3358385 | A1 * | 8/2018 | ........... G02B 6/2706 |
| EP | 2885886 | B1 * | 2/2019 | ........... H04B 10/501 |
| GB | 2439213 | A * | 12/2007 | ............. G02F 1/093 |
| RU | 2638095 | C1 | 12/2017 | |
| WO | 03009008 | A2 | 1/2003 | |

OTHER PUBLICATIONS

Beaudette et al., Advances in Multimodal Imaging Using Double-Clad Fiber Couplers, in Journal of Lightwave Technology, vol. 37, No. 22, pp. 5674-5685, Nov. 15, 15, 2019, doi: 10.1109/JLT.2019.2929926 (Year: 2019).*

Graceffo et al., Hybrid RF & FSO for Defense and 5G Backhaul, 2019 IEEE Globecom Workshops (GC Wkshps), Waikoloa, HI, USA, 2019, pp. 1-6, doi: 10.1109/GCWkshps45667.2019.9024320 (Year: 2019).*

Bohata et al., "Characterization of dual-polarization LTE radio over a free-space optical turbulence channel", Applied Optics, vol. 54, No. 29, Aug. 2015, 8 pages.

Abari et al., "A reconfigurable all-fiber polarization-diversity coherent Doppler lidar: principles and numerical simulations", Applied Optics, vol. 54, No. 30, Oct. 2015, 11 pages.

Nawaz et al., "A Compact, Bistatic Antenna System with Very High Interport Isolation for 2.4 GHz In-Band Full Duplex Applications", International Journal of Antennas and Propagation, vol. 2021, Jan. 2021, 8 pages.

International Search Report and Written Opinion of the International Searching Authority dated Jan. 9, 2023 in connection with International Patent Application No. PCT/US2022/076954, 10 pages.

(56) References Cited

OTHER PUBLICATIONS

International Search Report and Written Opinion of the International Searching Authority dated Jan. 2, 2023 in connection with International Patent Application No. PCT/US2022/076739, 12 pages.
International Search Report and Written Opinion of the International Searching Authority dated Jan. 2, 2023 in connection with International Patent Application No. PCT/US2022/076735, 11 pages.
International Search Report and Written Opinion of the International Searching Authority dated Jan. 2, 2023 in connection with International Patent Application No. PCT/US2022/076736, 10 pages.
Non-Final Office Action dated Nov. 15, 2024 in connection with U.S. Appl. No. 17/933,785, 13 pages.

* cited by examiner

DUAL-POLARIZATION ROTATIONALLY-INSENSITIVE MONOSTATIC TRANSCEIVER WITH DUAL CLADDING FIBER

CROSS-REFERENCE TO RELATED APPLICATIONS AND PRIORITY CLAIM

This application claims priority under 35 U.S.C. § 119(e) to U.S. Provisional Patent Application Nos. 63/246,648; 63/246,676; and 63/246,693 all filed on Sep. 21, 2021. These provisional applications are hereby incorporated by reference in their entirety.

This application is related to the following non-provisional patent applications being filed concurrently herewith:

U.S. patent application Ser No. 17/933,766 filed on Sep. 20, 2022 and entitled "SYSTEM AND METHOD FOR DIRECTIONALLY-DEPENDENT POLARIZATION MODIFICATION"; and U.S. patent application Ser No. 17/933,785 filed on Sep. 20, 2022 and entitled "DUAL-POLARIZATION ROTATIONALLY-INSENSITIVE MONOSTATIC TRANSCEIVER WITH STANDARD FIBER."

These non-provisional applications are hereby incorporated by reference in their entirety.

TECHNICAL FIELD

This disclosure is generally directed to optical systems. More specifically, this disclosure is directed to a dual-polarization rotationally-insensitive monostatic transceiver with dual cladding fiber.

BACKGROUND

Optical communication systems use light to transport data between locations. Next-generation optical transceivers are being designed for use in free-space optical systems, which refer to systems where optical signals are transmitted and received through free space rather than through optical fibers. Increasing the data capacity of free-space optical systems is becoming more and more important as the demand for high-throughput data products increases. Using two polarizations of light in an optical signal can double the capacity of a single optical channel. However, this is typically achieved using separate transmit and receive apertures in devices using the optical channel, which increases the size, cost, and complexity of the devices. While some monostatic systems have been developed that permit simultaneous transmission and reception of optical signals using a single aperture, these systems rely on the use of multiple wavelengths without any dual polarization capabilities.

SUMMARY

This disclosure is directed to a dual-polarization rotationally-insensitive monostatic transceiver with dual cladding fiber.

In a first embodiment, an apparatus includes multiple dual cladding waveguides each having (i) a single-mode interior section configured to transport one of multiple outgoing optical signals and (ii) a multimode section that at least partially surrounds the interior section and that is configured to transport one of multiple incoming optical signals, wherein different outgoing optical signals have different polarizations and different incoming optical signals have different polarizations. The apparatus also includes a polarization beamsplitter configured to (i) combine the multiple outgoing optical signals to produce transmit optical signals and (ii) separate receive optical signals to produce the multiple incoming optical signals.

In a second embodiment, a system includes at least two dual cladding waveguides. Each dual cladding waveguide corresponds to a respective optical channel and has (i) a single-mode interior section configured to transport one of multiple outgoing optical signals and (ii) a multimode section that at least partially surrounds the interior section and that is configured to transport one of multiple incoming optical signals. A first optical channel is associated with a first outgoing optical signal having a first polarization and a first incoming optical signal having the first polarization. A second optical channel is associated with a second outgoing optical signal having a second polarization and a second incoming optical signal having a second polarization. The system also includes a polarization beamsplitter configured to (i) combine the first and second outgoing optical signals to produce transmit optical signals and (ii) separate receive optical signals to produce the first and second incoming optical signals.

In a third embodiment, a method includes transporting, via at least two dual cladding waveguides, multiple outgoing optical signals and multiple incoming optical signals. Different outgoing optical signals have different polarizations, and different incoming optical signals have different polarizations. Each of the dual cladding waveguides includes (i) a single-mode interior section that transports one of the outgoing optical signals and (ii) a multimode section that at least partially surrounds the interior section and that transports one of the incoming optical signals. The method also includes combining the outgoing optical signals to produce transmit optical signals and separating receive optical signals to produce the incoming optical signals.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
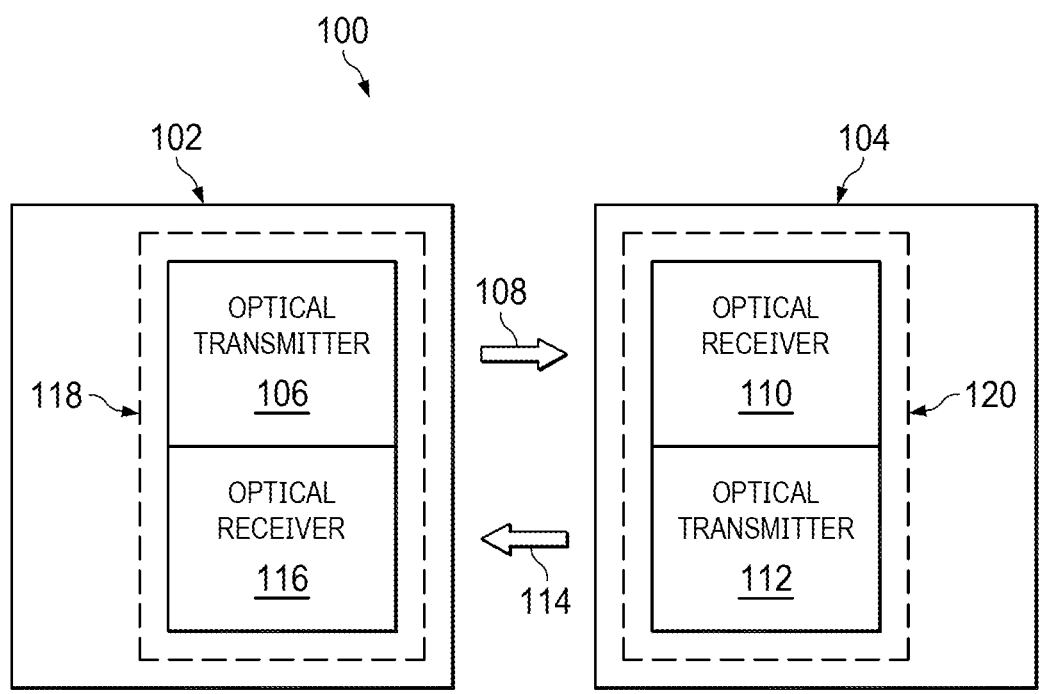
FIG. 1 illustrates an example free-space optical (FSO) system according to this disclosure.

FIGS. 1 through 4, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As described above, optical communication systems use light to transport data between locations. Next-generation optical transceivers are being designed for use in free-space optical systems, which refer to systems where optical signals are transmitted and received through free space rather than through optical fibers. Increasing the data capacity of free-space optical systems is becoming more and more important as the demand for high-throughput data products increases. Using two polarizations of light in an optical signal can double the capacity of a single optical channel. However, this is typically achieved using separate transmit and receive apertures in devices using the optical channel, which increases the size, cost, and complexity of the devices. While some monostatic systems have been developed that permit simultaneous transmission and reception of optical signals using a single aperture, these systems rely on the use of multiple wavelengths without any dual polarization capabilities.

This disclosure provides various implementations of dual-polarization rotationally-insensitive monostatic transceivers. Each dual-polarization rotationally-insensitive monostatic transceiver includes a dual cladding fiber (DCF) or other dual cladding waveguide that has (i) a single-mode (SM) interior section and (ii) a larger multimode (MM) section that at least partially surrounds the interior section. In some cases, a dual cladding waveguide is used with active feedback, which controls (and ideally optimizes) transmit power when using a single-mode core. In other cases, a dual cladding waveguide is used with a polarization-maintaining (PM) core (where feedback would not be needed) or a single-mode core (SMC) without feedback (but eliminating channel crosstalk). In some embodiments, the inner section of a dual cladding waveguide is used for transmitting one optical signal, and the multimode section of the dual cladding waveguide is used for receiving another optical signal.

Some embodiments of this disclosure provide dual-polarization transmit and receive capabilities in a monostatic transceiver. Various embodiments allow the same wavelength or different wavelengths to be used on any transmit or receiver channel without interference. Single-mode or PM fiber may be used for outgoing optical signals. When PM fiber is not used, the transceiver may generate orthogonal transmit beams (also referred to as signals) that will not interfere. In some embodiments, a transceiver does not require complex dual cladding fiber and includes a passive rotationally-invariant transmit and receiver capability to simplify use across platforms. Moreover, some embodiments can maintain compatibility with intensity modulation or complex modulation formats. The transceivers can also maintain compatibility with multiple data rates on different channels if needed or desired or maintain compatibility with wavelength division multiplexing (WDM) for increasing data capacity. Some embodiments provide a transceiver that is compatible with an all-fiber-based etalon-enhanced receiver for modularity. Some embodiments enable separate tracking of multiple polarization channels when in the same field of view. According to some embodiments, position, acquisition, and tracking flexibility can be used depending on how a transceiver is configured. In addition, a monostatic transceiver may use directionally-dependent polarization modification to apply relative polarization rotation as a function of a direction of propagation of a light beam.

FIG. 1 illustrates an example free-space optical (FSO) system 100 according to this disclosure. As shown in FIG. 1, the system 100 includes two nodes 102 and 104 that communicate with one another optically. Each node 102 and 104 represents a ground-, air-, or space-based system that can transmit or receive data using optical communications. In this example, the nodes 102 and 104 can engage in bidirectional communication with one another. However, this is not necessarily required, and the nodes 102 and 104 may engage in unidirectional communication with one another (meaning one node 102 or 104 may only transmit and the other node 104 or 102 may only receive, at least with respect to each other).

The node 102 in this example includes an optical transmitter 106, which generally operates to produce optical signals 108 used for communication or other purposes. For example, the optical transmitter 106 may encode information onto the optical signals 108, such as by using suitable amplitude, phase, frequency, or other modulation(s) of light. The optical signals 108 can be transmitted through free space or other transmission medium to the node 104, where an optical receiver 110 receives and processes the optical signals 108. For instance, the optical receiver 110 can identify the amplitude, phase, frequency, or other modulation(s) of light in the optical signals 108 and use the identified modulation(s) to recover the information encoded onto the optical signals 108. Any suitable type of modulation/demodulation scheme may be used here to encode and decode the optical signals 108 (assuming communication is one purpose of the optical signals 108). Since the nodes 102 and 104 are bidirectional in this example, the same process can be used in the opposite direction, meaning an optical transmitter 112 of the node 104 produces optical signals 114 that are transmitted towards the node 102 and received and processed by an optical receiver 116 of the node 102.

Note that while the optical transmitter 106 and the optical receiver 116 are shown here as separate components, they can be integrated into a single optical transceiver 118. This may allow, for example, the same structure to be used for both transmission and reception purposes. Similarly, while the optical transmitter 112 and the optical receiver 110 are shown here as separate components, they can be integrated into a single optical transceiver 120. This may allow, for instance, the same structure to be used for both transmission and reception purposes.

The optical transmitters, receivers, and transceivers described in this disclosure may find use in a large number of applications, such as communications, imaging, and remote sensing applications. For example, optical transmitters, receivers, or transceivers may be used in data centers or telecommunication systems to transport information rapidly between locations, including the transport of large amounts of information over very large distances. Optical transmitters, receivers, or transceivers may be used in consumer or commercial electronic devices, biomedical devices, or advanced computing devices to support optical-based communications with those devices. Optical transmitters, receivers, or transceivers may be used in airplanes, drones, satellites, autonomous vehicles, rockets, missiles, or other commercial or defense-related systems. Optical transmitters, receivers, or transceivers may be used in non-communication-related optical applications, such as laser detection and ranging (LADAR) applications, MIMO or higher-capacity optical links, light detection and ranging (LIDAR) systems, optical ground stations, and point-to-point optical links, or other applications that can use polarimetric processing. In general, this disclosure is not limited to any particular application of the optical transmitters, receivers, and transceivers.

Although FIG. 1 illustrates one example of a free-space optical system 100, various changes may be made to FIG. 1. For example, while only two nodes 102 and 104 are shown here, the system 100 may include any suitable number of nodes that engage in any suitable unidirectional, bidirectional, or other communications or other interactions with each other. Also, each node of the system 100 may include any suitable number of optical transmitters, receivers, or transceivers that communicate or otherwise use any number of optical signals. In addition, the system 100 is shown in simplified form here and may include any number of additional components in any suitable configuration as needed or desired.

Figure 2:
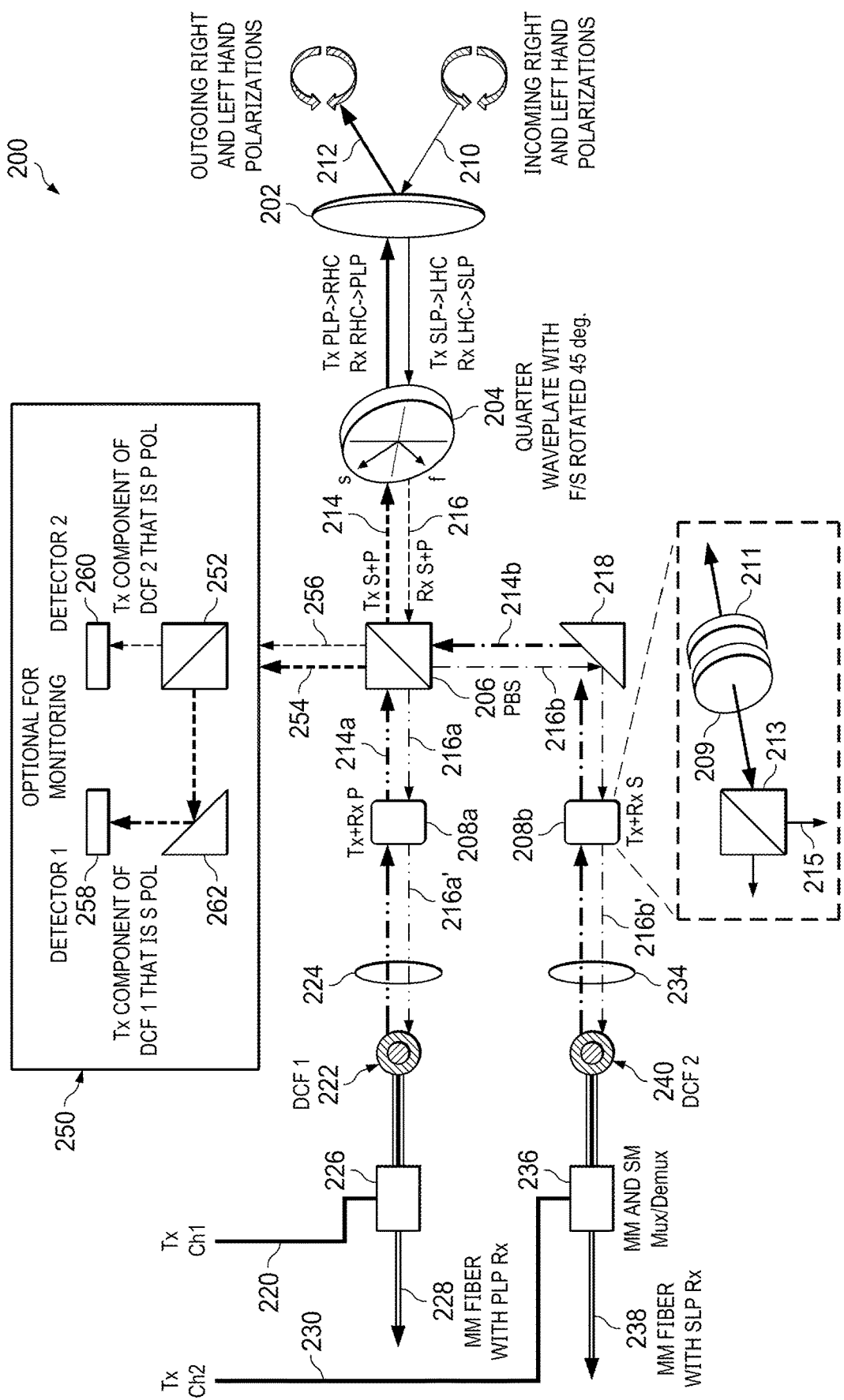
FIG. 2 illustrates an example monostatic optical transceiver according to this disclosure.

FIG. 2 illustrates an example monostatic optical transceiver 200 according to this disclosure. The optical transceiver 200 may, for example, represent or be used within the optical nodes 102 and 104 of the system 100 of FIG. 1. However, the optical transceiver 200 may be used in any other suitable device(s) and in any other suitable system(s).

As shown in FIG. 2, the monostatic optical transceiver 200 includes a collection telescope 202, a quarter waveplate 204, a polarization beam splitter (PBS) 206, and at least one optical modification device (OMD) 208a-208b. Each OMD 208a-208b includes a Faraday rotator 209, a waveplate 211, and a PBS 213. Each OMD 208a-208b represents a directionally-dependent polarization rotation optical assembly. The waveplate 211 can be a half waveplate or a quarter waveplate. In some embodiments, each OMD 208a-208b includes a Faraday rotator 209 providing a polarization rotation of about 45° and a half waveplate 211 with its fast axis rotated about 22.5° from the +x axis. However, other embodiments of the Faraday rotator 209 and the waveplate 211 may be used. For instance, various arrangements of Faraday rotators and waveplates are described in U.S. patent application Ser No. 17/933,766 filed on Sep. 20, 2022 and entitled "SYSTEM AND METHOD FOR DIRECTIONALLY-DEPENDENT POLARIZATION MODIFICATION," which has been incorporated by reference above. The PBS 213 can extract a sampled signal 215 of light passing through the OMD 208a-208b, such as for use in generating a control signal that allows for adjustments to the position of one or more dual cladding fibers. In some embodiments, the monostatic optical transceiver 200 includes two or more channels and is configured to transmit and receive on each channel. Here, the monostatic optical transceiver 200 can employ two or more OMD 208a-208b to provide directionally-dependent polarization modifications, such as to permit a beam propagating in one direction to undergo no substantial polarization change while a beam propagating in the opposite direction is rotated by about 90°.

In the optical transceiver 200, optical communication signals can be transmitted and received via respective light beams, which carry communication signals. Note that the terms "beams" and "signals" may be used interchangeably. In some cases, optical communication signals can be transmitted and received on at least two wavelengths or channels, where each channel includes transmit optical signals and receive optical signals. The telescope 202 is configured to receive and focus incoming receive (Rx) beams 210 and expand and direct outgoing transmit (Tx) beams 212. Each channel may include at least one transmit beam 212 and at least one receive beam 210.

The quarter waveplate 204 is configured, for each channel, to convert a polarization of light from a linear polarization to a circular/elliptical polarization and vice versa. For example, on a first channel (Ch1), the quarter waveplate 204 may be configured to (i) convert a transmit beam 214 having a P linear polarization (transmit PLP) into a transmit beam 212 having a right-hand circular (RHC) polarization and (ii) convert a receive beam 210 having a right-hand circular (RHC) polarization into a receive beam 216 having a P linear polarization (receive PLP). On a second channel (Ch2), the quarter waveplate 204 may be configured to (i) convert another transmit beam 214 having an S linear polarization (transmit SLP) into another transmit beam 212 having a left-hand (LHC) polarization and (ii) convert another receive beam 210 having an LHC polarization into another receive beam 216 having an S linear polarization (receive SLP). The ability to transmit and receive optical beams having circular polarizations enables devices to communicate with one another irrespective of rotational orientation. As a result, the quarter waveplate 204 enables two nodes (such as nodes 102 and 104 in FIG. 1) to communicate without having to be rotationally aligned with each other. In this example, the transmit beam 214 can include signals with P and S linear polarizations, and the receive beam 216 can include signals with P and S linear polarizations.

The PBS 206 is configured to combine and separate channels by combining and separating P and S components within optical beams. For example, in the outgoing direction, the PBS 206 can combine transmit beams 214a-214b having different P and S polarizations in different channels into the transmit beams 214. In the incoming direction, the PBS 206 can separate the receive beams 216 into receive beams 216a-216b having different P and S polarizations in the different channels. In this example, the transmit beam 214a and the receive beam 216a both have a P linear polarization, and the transmit beam 214b and the receive beam 216b both have an S linear polarization. As can be seen here, the PBS 206 is configured to separate the channels for the receive beams 216 and combine the channels for the transmit beams 214. In this example, a mirror or other reflector 218 can be used to help direct signals to and from the PBS 206.

In this example, the monostatic optical transceiver 200 receives outgoing signals from dual clad fibers (DCFs) 222 and 240 and delivers incoming signals to the DCFs 222 and 240. Each DCF 222 and 240 can represent an optical fiber or other waveguide that is configured to transport outgoing signals on a single mode fiber (SMF) and incoming signals on a multi-mode (MM) fiber. For instance, each DCF 222 and 240 may include (i) a single-mode interior section configured to transport one of multiple outgoing optical signals and (ii) a multimode section that at least partially surrounds the interior section and that is configured to transport one of multiple incoming optical signals. In other cases, each DCF 222 and 240 is used with a polarization-maintaining (PM) core (where feedback would not be needed) or a single-mode core (SMC) without feedback (but eliminating channel crosstalk). In some embodiments, the inner section of each DCF or other dual cladding waveguide is used for transmitting one optical signal, and the multi-mode section of the dual cladding waveguide is used for receiving another optical signal. Each DCF 222 and 240 is coupled to a respective multiplexer/demultiplexer (Mux/Demux) 226, 236 in order to allow transmit and receive optical signals to be transported over the same waveguide. After passing through a MM and SM multiplexer/demultiplexer (Mux/Demux) 226, 236, the two received channels can be detected and demodulated separately and on a non-interfering basis.

Each OMD 208a-208b can be configured to maintain or modify light according to a direction of propagation of the light through the OMD 208a-208b. In the example shown in FIG. 2, the OMD 208a receives the transmit beam 214a, which is provided using an SMF 220 of the DCF 222 through respective lenses 224, 234. Similarly, the OMD 208b receives the transmit beam 214b, which is provided using an SMF 230 of the DCF 240. In some cases, each OMD 208a-208b is configured to maintain an angular polarization of the associated transmit beam 214a-214b while modifying an angular polarization of an associated receive beam 216a-216b, which is provided over a MM fiber 228 or 238 of the DCF 222 or 240. For example, the transmit beams 214a-214b propagate through the respective OMDs 208a-208b in a first direction, while the receive beams 216a-216b propagate through the OMDs 208a-208b in a second direction opposite the first direction. In some cases, the transmit beams 214a-214b may pass through the OMDs 208a-208b with little or no polarization modifications, while the receive beams 216a-216b can have their polarizations rotated as they propagate through the OMDs 208a-208b. This results in the creation of receive beams 216a' and 216b'. Accordingly, each incoming beam can propagate along the receive direction and have its polarization rotated by about 90° or other angle compared to the associated outgoing beam (which may remain unchanged). Note, however, that this can be reversed so that the outgoing signals are rotated and the incoming signals are not. This approach supports the use of dual polarizations in the optical transceiver 200, which helps to provide a monostatic rotationally invariant configuration. In some embodiments, the optical signals in the different channels of the optical transceiver 200 have different wavelengths.

Note that the depictions of the signals, polarizations, and fibers as shown in FIG. 2 are for illustration only, and the particulars of the separation and combining of signals can be changed without departing from the scope of this disclosure. Embodiments of the present disclosure provide a monostatic optical transceiver 200 that include at least one directionally-dependent optical assembly, namely one or more OMDs 208a-208b, which are used to provide directionally-dependent polarization modification that enable multiple beams to be used in the same transceiver aperture. In this example, the optical transceiver 200 is configured to communicate in free space using light having circular polarizations, which makes devices insensitive to relative orientation. The optical transceiver 200 here is designed so that counter-propagating beams of the same polarization can be separated on anon-interfering basis to provide the use of dual polarization.

In some embodiments, as described above, the OMD 208a can be configured to pass light in one direction substantially unmodified and to rotate the polarization of light passing in the opposite direction (such as by 10°). Assuming the OMD 208a uses the directionally-dependent optical modification device, the half waveplate 211 fast axis may be oriented at about 2.5° from the positive x-axis, and the Faraday rotator 209 may have a thickness that provides a 5° rotation. In the first channel Ch1, transmit light (P polarized) is rotated 5° by the Faraday rotator 209 and then −5° by the half waveplate 211, leaving the outgoing polarization substantially unchanged. In the first channel Ch1, receive light (P polarized) is rotated −5° by the half waveplate 211 and then −5° by the Faraday rotator 209, leaving the incoming polarization rotated by −10° in changed receive signal 216a'.

In some embodiments, as described above, the OMDs 208b can be configured to modify light passing in one direction by some amount (such as)−90° and modify light passing in the opposite direction by a different amount (such as)−100°. Assuming the OMD 208b uses the directionally-dependent optical modification device, the half waveplate 211 fast axis may be oriented at about 137.5° from the positive x-axis, and the Faraday rotator 209 may have a thickness that provides a 5° rotation. In the second channel Ch2, transmit light (P polarized) is rotated 5° by the Faraday rotator 209 and then −95° by the half waveplate 211 to provide a −90° rotational adjustment (converts P polarization to S polarization) to the transmit beam 214a. In the second channel Ch2, receive light (S polarized) is rotated −95° by the half waveplate 211 and then −5° by the Faraday rotator 209, leaving the incoming polarization rotated by −100° at changed receive signal 216b'. The outgoing beams are combined by the PBS 206, and the S and P polarizations are converted to circular polarizations after passing through the quarter waveplate 204. This enables dual-channel transmission.

In some embodiments, each PBS 213 is configured to extract an S component of the receive beam 216a'-216b' as the sampled signal 215a-215b. In some cases, each PBS 213 can extract the S component from a signal by reflecting the S polarized component while allowing the P polarized component to proceed unattenuated. As noted above, the sampled signals 215 can be used as a control signal by a position sensitive detector or other feedback mechanism.

For dual-channel rotationally-invariant reception, circularly-polarized light is captured by the telescope 202 and provided to the quarter waveplate 204, which can have its fast axis rotated by −45° from the positive x-axis (as viewed from the incoming light). The incoming light is converted to S and P polarized light, and these two orthogonal polarizations are separated by the PBS 206 into separate paths. In these paths, the S and P polarized receive beams overlap the S and P polarized transmit beams in space, but the transmit and receive beams travel in opposite directions in each path. In the OMD 208a, the P polarized receive beam is rotated −5° by the half waveplate 211 and to −10° by the Faraday rotator 209. In the OMD 208b, the S polarized receive beam is rotated −95° by the half waveplate 211 and to −10° by the Faraday rotator 209. When propagating along the receive direction, both polarizations are rotated to −10°. This allows for dual polarization reception with rotational invariance. Note, however, that the positions of the Faraday rotator 209 and the half waveplate 211 can be reversed if the angular orientation of the waveplate, and thickness of the Faraday rotator are changed.

In some embodiments, the monostatic optical transceiver 200 includes a monitoring circuit 250 configured to monitor incorrectly polarized light on the transmit signals on the DCFs 222 and 240. The monitoring circuit 250 and the PBS 206 are also collectively configured to clean up transmit beams by isolating and removing noise caused by incorrect polarizations on the transmit beams. In this example, the monitoring circuit 250 includes a PBS 252. Here, the PBS 206 separates an S polarized portion 254 of light from the P-polarized transmit beam 214a and directs the S polarized portion 254 to the PBS 252. The PBS 206 also separates a P polarized portion 256 of light from the S-polarized transmit beam 214b, which is provided to the PBS 252.

The PBS 252 reflects the S polarized portion 254 towards a first detector 258 and allows the P polarized portion 256 to propagate towards a second detector 260. In some embodiments, the monitoring circuit 250 may include another PBS, mirror, or other reflector 262 configured to direct the S polarized portion 254 from the PBS 252 towards the detector 258. In this way, the monitoring circuit 250 and the PBS 206 are configured to isolate and remove power to incorrect polarizations of the transmit beams. In certain embodiments, monitoring circuit 250 and the PBS 206 are configured to only monitor the incorrect polarizations of the transmit beams. Here, the PBS 206 is configured to (i) isolate an incorrect polarized portion of at least one of the multiple outgoing optical signals and (ii) direct the incorrect polarized portion to the monitoring circuit 250. In some embodiments, signals received by the detectors 258 and 260 are used to monitor the amount of incorrectly polarized light present in the transmit beams. The monitoring circuit 250 and the PBS 206 collectively combine the two orthogonal channels while also stripping off incorrect polarizations (if present) from each channel to reduce or eliminate crosstalk.

Although FIG. 2 illustrate one example of a monostatic optical transceiver 200, various changes may be made to FIG. 2. For example, the monostatic optical transceiver 200 may include any suitable number of optical devices or different types of devices. As a more specific example, the particulars of the separation and combination of beams can be changed. Also, while the monostatic optical transceiver 200 shown in FIG. 2 is described as using half waveplates 211 in the OMDs 208a-208b, embodiments using quarter waveplates can be used. In addition, any other suitable components may be used with the monostatic optical transceiver 200 to support any other desired functions of the monostatic optical transceiver 200.

Figure 3:
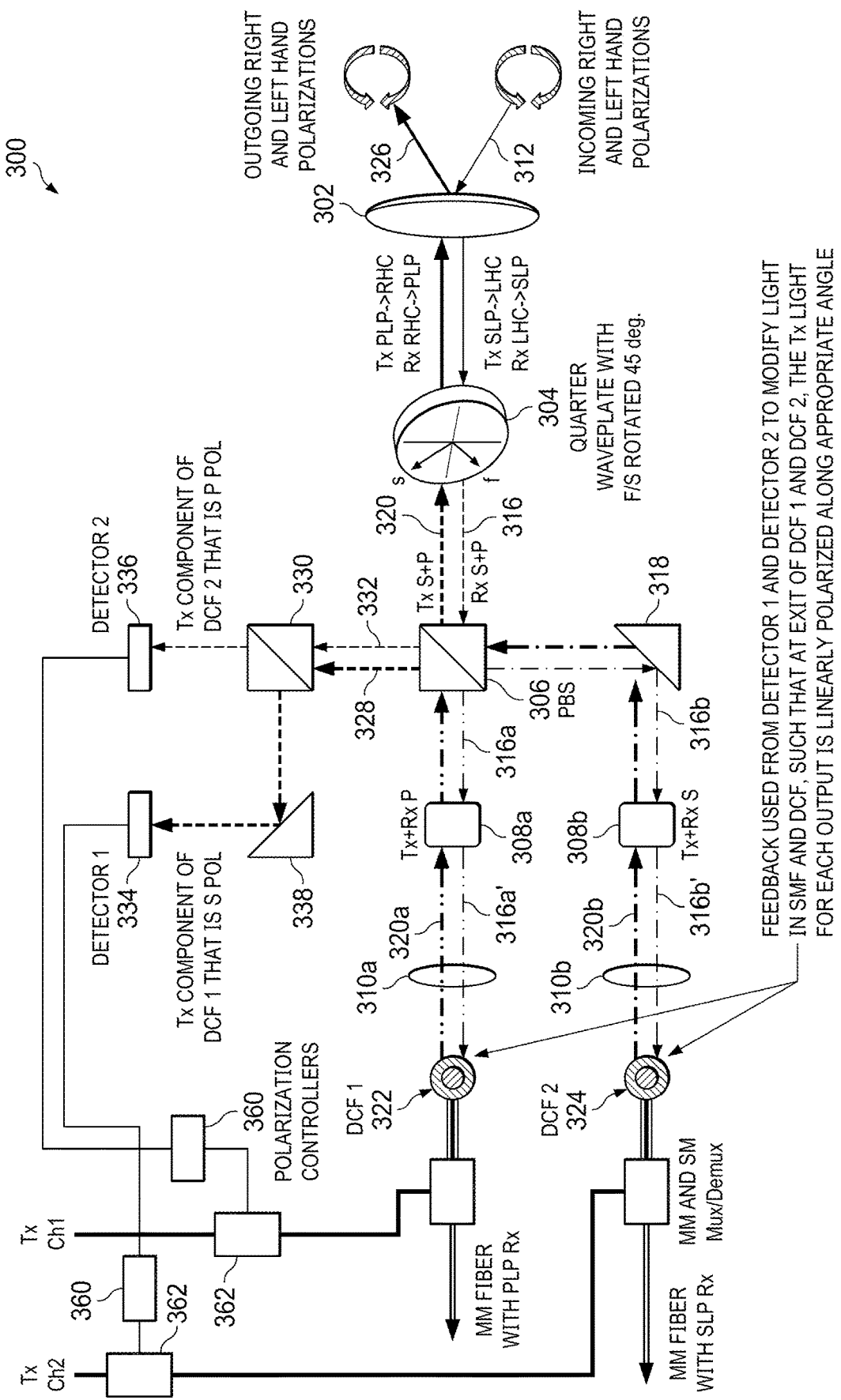
FIG. 3 illustrates an example monostatic optical transceiver with control feedback according to this disclosure.

FIG. 3 illustrates an example monostatic optical transceiver 300 with control feedback according to this disclosure. The optical transceiver 300 may, for example, represent or be used within the optical nodes 102 and 104 of the system 100 of FIG. 1. However, the optical transceiver 300 may be used in any other suitable device(s) and in any other suitable system(s).

In some embodiments, the monostatic optical transceiver 300 can include various common or similar components described above with respect to the monostatic optical transceiver 200 in FIG. 2. As shown in FIG. 3, the monostatic optical transceiver 300 includes a telescope 302, a quarter waveplate 304, a PBS 306, OMDs 308a-308b, channel lenses 310a-310b, and a control feedback circuit. The control feedback circuit includes a PBS 330, a reflector 338, and detectors 334-336. Incoming and outgoing signals can be transported over DCFs 322-324. In some cases, each DCF 322-324 is used with active feedback, which controls (and ideally optimizes) transmit power through polarization control when using a single-mode core.

Receive beams 312 are received via the telescope 302 and include circular/elliptical polarizations, such as when a first receive beam includes an LHC polarization and a second receive beam includes an RHC polarization. The quarter waveplate 304 converts the circularly/elliptically-polarized receive beams 312 into linear-polarized receive beams 316, such as when the LHC polarization is converted into a P linear polarization and the RHC polarization is converted into an S linear polarization. The PBS 306 is configured to combine and separate channels by combining and separating P and S components within optical beams. For instance, the PBS 306 may combine transmit beams 320a-320b having S and P polarizations into a transmit beam 320, and the PBS 306 may split a receive beam 316 into receive beams 316a-316b having S and P polarizations. The OMDs 308a-308b can allow light propagating in one direction to remain substantially unmodified while rotating light propagating in the opposite direction. For instance, each OMD 308a-308b may rotate the polarizations of the receive beams 316a-316b by 10° or other amounts to produce receive beams 316a'-316b'. A reflector 318 can be used to direct light to and from the PBS 306.

The P-polarized transmit beam 320a is received from the DCF 322 through the channel lens 310a, and the P-polarized transmit beam 320b is received from the DCF 324 through the channel lens 310b. The PBS 306 combines the transmit beams 320a-320b after any relevant polarization modification into the transmit beams 320. The quarter waveplate 304 converts the linear polarizations of the transmit beams 320 to circular/elliptical polarizations for the transmit beams 326. In some cases, P linear polarization is converted into RHC polarization, and S linear polarization is converted into LHC polarization.

The PBS 306 is further configured to extract portions of the transmit beams 320 by reflecting an S-polarized portion 328 of the transmit beam 320a to the PBS 330 and allowing a P-polarized portion 332 of the transmit beam 320b to pass to the PBS 330. The PBS 330 separates the S-polarized portion 328 from the P-polarized portion 332, reflects the S-polarized portion 328 towards the detector 334, and allows the P-polarized portion 332 to propagate towards the detector 336. In some embodiments, the S-polarized portion 328 is redirected towards the detector 334 by a reflector 338. The PBS 306, PBS 330, reflector 338, and detectors 334-336 can collectively form a feedback control circuit configured to clean up transmit beams by minimization power on the incorrect polarizations on the transmit beams.

In this example, the feedback control circuit is configured to provide feedback to control one or more polarization controllers 360. For example, signals from the detectors 334-336 can be communicated to the polarization controllers 360, where the feedback from the detectors 334-336 is used to modify light by adjusting an angle of polarization of each transmit beam 320a-320b. As a particular example, in response to the signals from the detectors 334-336, the polarization controllers 360 may cause stress to be applied to the respective DCFs 322-324, or to a single mode core, to modify light such that the light beams communicated through the channel lenses 310a-310b are linearly polarized along appropriate angles. In some cases, the polarization controllers 360 control stressers 362 that apply stresses to the respective DCFs 322-324, or to the respective single mode core, in order to achieve this. Each stresser 362 represents any suitable structure configured to apply stress to an optical waveguide, such as a crimping device that is configured to bend, squeeze, or otherwise stress the waveguide.

Although FIG. 3 illustrate one example of a monostatic optical transceiver 300 with control feedback, various changes may be made to FIG. 3. For example, the monostatic optical transceiver 300 may include any suitable number of optical devices or different types of devices. As a more specific example, the particulars of the separation and combination of beams can be changed. Also, any other suitable components may be used with the monostatic optical transceiver 300 to support any other desired functions of the monostatic optical transceiver 300.

Figure 4:
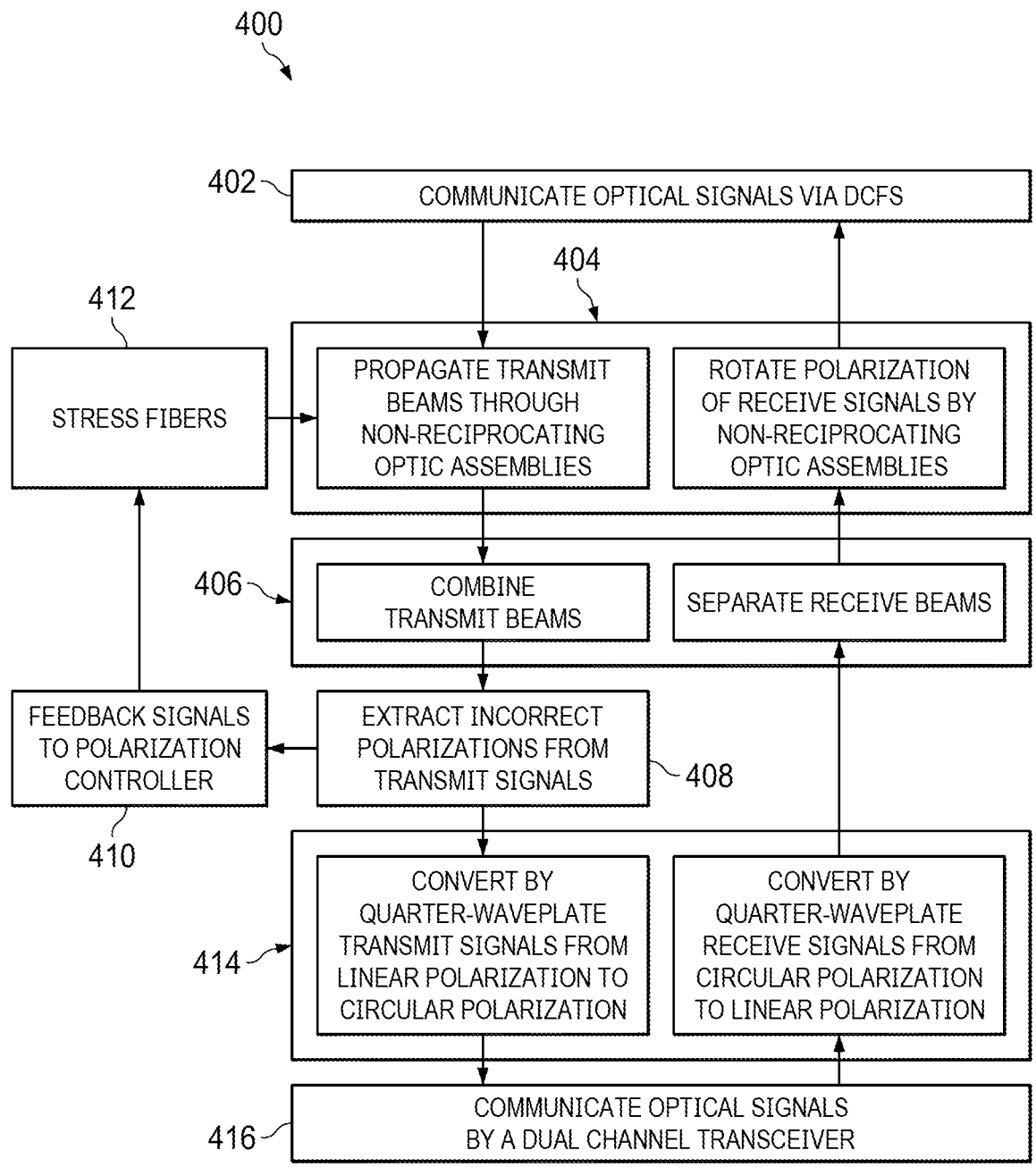
FIG. 4 illustrates an example method for transmitting and receiving multiple non-interfering polarization signals according to this disclosure.

FIG. 4 illustrates an example method 400 for transmitting and receiving multiple non-interfering polarization signals according to this disclosure. For ease of explanation, the method 400 is described with respect to the monostatic optical transceiver 300 of FIG. 3. However, the method 400 could be used with any other suitable optical transceiver, such as the optical transceiver 200 of FIG. 2.

In step 402, transmit beams and receive beams are communicated via DCFs. For example, two transmit beams can be received via SM fibers in first and second DCFs, and two receive beams can be provided to MM fibers in the first and second DCFs. Each of the transmits beams can be received with a respective polarity and on a respective channel, and each of the receive beams can be provided with a respective polarity on a respective channel. As a particular example, a first transmit beam with a P polarization may be received on a first channel, a second transmit beam with an S polarization may be received on a second channel, a first receive beam with an S polarization may be provided on the first channel, and a second receive beam with a P polarization may be provided on the second channel.

In step 404, the transmit and receive beams are propagated through directionally-dependent optical assemblies, such as OMDs 308a-308b. For example, in the first channel, the first transmit beam and the first receive beam can propagate through a first OMD 308a. In the second channel, the second transmit beam and the second receive beam can propagate through a second OMD 308b. In some cases, each OMD 308a-308b may be configured to pass light (such as the transmit beams) propagating in one direction substantially unmodified while rotating the polarization of light (such as the receive beams) propagating in the opposite direction.

In step 406, the transmit beams from the channels are combined, and the receive beams are separated into the channels. For example, the transmit beams from the channels may be combined by allowing the transmit beam from the first channel to propagate through the PBS 306 while reflecting the transmit beam from the second channel by the PBS 306. The PBS 306 can also split incoming light into the receive beams in the channels based on the polarizations in the incoming light.

In step 408, incorrect polarizations (if any) are extracted from the transmit beams. For example, the PBS 306 may be configured to reflect an S-polarized portion 328 of the transmit beam 320a and allow a P-polarized portion 332 of the transmit beam 320b to pass to the PBS 330 in a monitoring or feedback circuit. Accordingly, the PBS 306 removes the S-polarized portion 328 from the transmit beam 320a (which is P polarized) and removes the P-polarized portion 332 from the transmit beam 320b (which is S polarized). In step 410, the feedback circuit provides feedback signals to respective polarization controllers 360. For example, the detectors 334-336 can be used to measure the S-polarized portion 328 and the P-polarized portion 332 and provide measurements or other information to the polarization controllers 360. In step 412, the polarization controllers 360 apply stresses to respective DCFs, or to the single mode core. For example, the polarization controllers 360 can control stressors 362 that apply stress to the DCFs 322-324, or to the single mode core, in order to modify the light in the transmit beams.

In step 414, the transmit and receive beams propagate through a quarter waveplate. The quarter waveplate 304 converts the transmit beams from linear polarizations to circular/elliptical polarizations, and the quarter waveplate 304 converts the receive beams from circular/elliptical polarizations to linear polarizations. In step 416, the beams are used for communication or other purposes.

Although FIG. 4 illustrates one example of a method 400 for transmitting and receiving multiple non-interfering polarization signals, various changes may be made to FIG. 4. For example, while shown as a series of steps, various steps in FIG. 4 could overlap, occur in parallel, occur in a different order, or occur multiple times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   multiple dual cladding waveguides each comprising (i) a single-mode interior section configured to transport one of multiple outgoing optical signals and (ii) a multimode section that at least partially surrounds the interior section and that is configured to transport one of multiple incoming optical signals, wherein different outgoing optical signals have different polarizations and different incoming optical signals have different polarizations;
   a feedback loop; and
   a polarization beamsplitter configured to:
   (i) combine the multiple outgoing optical signals to produce transmit optical signals;
   (ii) separate receive optical signals to produce the multiple incoming optical signals;
   (iii) isolate incorrectly-polarized light of at least one of the multiple outgoing optical signals; and
   (iv) direct the incorrectly-polarized light to the feedback loop;
   wherein the feedback loop is configured to remove power to the incorrectly-polarized light of the at least one of the multiple outgoing optical signals.

2. The apparatus of claim 1, further comprising:
   a waveplate configured to (i) convert the transmit optical signals into first free-space optical signals having right-hand circular polarization to be transmitted on a first wavelength and left-hand circular polarization to be transmitted on a second wavelength and (ii) convert second free-space optical signals having the left-hand circular polarization received on the first wavelength and the right-hand circular polarization received on the second wavelength into the receive optical signals having a linear polarization.

3. The apparatus of claim 2, further comprising a transceiver;
wherein the transceiver comprises the dual cladding waveguides, the polarization beamsplitter, and the waveplate.

4. The apparatus of claim 1, further comprising:
multiple optical modification devices (OMDs) optically positioned between the dual cladding waveguides and the polarization beamsplitter, each OMD comprising a Faraday rotator and an additional waveplate;
wherein each Faraday rotator and its associated additional waveplate are collectively configured to provide a relative polarization change between (i) light propagating in a first direction through the Faraday rotator and the additional waveplate and (ii) light propagating in a second direction opposite the first direction through the Faraday rotator and the additional waveplate.

5. The apparatus of claim 1, wherein the dual cladding waveguides comprise dual cladding fibers.

6. The apparatus of claim 1, further comprising:
polarization controllers configured to control the polarizations of the multiple outgoing optical signals;
wherein the feedback loop is configured to control the polarization controllers.

7. The apparatus of claim 6, further comprising multiple waveguide stressers;
wherein the feedback loop comprises multiple detectors each configured to receive the incorrectly-polarized light in the at least one of the outgoing optical signals; and
wherein each waveguide stresser is configured, in response to a signal from one of the multiple detectors, to stress at least one of the dual cladding waveguides, or single mode core, in order to adjust a polarization angle of the at least one of the outgoing optical signals.

8. A system comprising:
at least two dual cladding waveguides, each dual cladding waveguide corresponding to a respective optical channel and comprising (i) a single-mode interior section configured to transport one of multiple outgoing optical signals and (ii) a multimode section that at least partially surrounds the interior section and that is configured to transport one of multiple incoming optical signals, wherein a first optical channel is associated with a first outgoing optical signal having a first polarization and a first incoming optical signal having the first polarization, and wherein a second optical channel is associated with a second outgoing optical signal having a second polarization and a second incoming optical signal having the second polarization;
a feedback loop; and
a polarization beamsplitter configured to:
(i) combine the first and second outgoing optical signals to produce transmit optical signals;
(ii) separate receive optical signals to produce the first and second incoming optical signals;
(iii) isolate incorrectly-polarized light of at least one of the multiple outgoing optical signals; and
(iv) direct the incorrectly-polarized light to the feedback loop;
wherein the feedback loop is configured to remove power to the incorrectly-polarized light of the at least one of the multiple outgoing optical signals.

9. The system of claim 8, further comprising:
a waveplate configured to (i) convert the transmit optical signals into first free-space optical signals having right-hand circular polarization to be transmitted on a first wavelength and left-hand circular polarization to be transmitted on a second wavelength and (ii) convert second free-space optical signals having the left-hand circular polarization received on the first wavelength and the right-hand circular polarization received on the second wavelength into the receive optical signals.

10. The system of claim 8, further comprising:
multiple optical modification devices (OMDs) optically positioned between the dual cladding waveguides and the polarization beamsplitter, each OMD comprising a Faraday rotator and an additional waveplate;
wherein each Faraday rotator and its associated additional waveplate are collectively configured to provide a relative polarization change between (i) light propagating in a first direction through the Faraday rotator and the additional waveplate and (ii) light propagating in a second direction opposite the first direction through the Faraday rotator and the additional waveplate.

11. The system of claim 8, further comprising:
polarization controllers configured to control the polarizations of the multiple outgoing optical signals;
wherein the feedback loop is configured to control the polarization controllers.

12. The system of claim 11, further comprising multiple waveguide stressers;
wherein the feedback loop comprises multiple detectors each configured to receive the incorrectly-polarized light in the at least one of the outgoing optical signals; and
wherein each waveguide stresser is configured, in response to a signal from one of the multiple detectors, to stress at least one of the dual cladding waveguides, or a single mode core, in order to adjust a polarization angle of the at least one of the outgoing optical signals.

13. A method comprising:
transporting, via at least two dual cladding waveguides, multiple outgoing optical signals and multiple incoming optical signals, wherein different outgoing optical signals have different polarizations and different incoming optical signals have different polarizations,
wherein each of the dual cladding waveguides comprises (i) a single-mode interior section that transports one of the outgoing optical signals and (ii) a multimode section that at least partially surrounds the interior section and that transports one of the incoming optical signals;
combining the outgoing optical signals to produce transmit optical signals;
separating receive optical signals to produce the incoming optical signals;
isolating incorrectly-polarized light of at least one of the multiple outgoing optical signals;
directing the incorrectly-polarized light to a feedback loop; and
removing, by the feedback loop, power to the incorrectly-polarized light of the at least one of the multiple outgoing optical signals.

14. The method of claim 13, further comprising:
using a waveplate to:
convert the transmit optical signals into first free-space optical signals having right-hand circular polarization to be transmitted on a first wavelength and left-hand circular polarization to be transmitted on a second wavelength; and
convert second free-space optical signals having the left-hand circular polarization received on the first wavelength and the right-hand circular polarization received on the second wavelength into the receive optical signals having a linear polarization.

15. The method of claim 13, further comprising:
propagating the incoming optical signals and the outgoing optical signals through optical modification devices (OMDs) optically positioned between the dual cladding waveguides and a polarization beamsplitter, each OMD comprising a Faraday rotator and an additional waveplate;
wherein each Faraday rotator and its associated additional waveplate collectively provide a relative polarization change between (i) light propagating in a first direction through the Faraday rotator and the additional waveplate and (ii) light propagating in a second direction opposite the first direction through the Faraday rotator and the additional waveplate.

16. The method of claim 13, further comprising:
controlling, by polarization controllers, the polarizations of the multiple outgoing optical signals in response to signals from the feedback loop.

17. The method of claim 16, wherein controlling the polarizations of the multiple outgoing optical signals comprises:
in response to at least one signal from one or more of multiple detectors in the feedback loop, stressing, by at least one of the polarization controllers, at least one of the dual cladding waveguides, or a single mode fiber, in order to adjust a polarization angle of the at least one of the outgoing optical signals.

18. The system of claim 9, further comprising a transceiver;
wherein the transceiver comprises the dual cladding waveguides, the polarization beamsplitter, and the waveplate.

19. The system of claim 8, wherein the dual cladding waveguides comprise dual cladding fibers.

20. The method of claim 13, wherein the dual cladding waveguides comprise dual cladding fibers.

* * * * *